United States Patent
Borchardt et al.

[11] Patent Number: 5,188,010
[45] Date of Patent: Feb. 23, 1993

[54] ARRANGEMENT FOR CUTTING THIN-WALLED BELTS FROM A CLOSED BAND OF RUBBER

[75] Inventors: Horst Borchardt; Peter Barkowsky, both of Burgdorf; Jörg-Richard Friedrich, Nordstemmen, all of Fed. Rep. of Germany

[73] Assignee: Hermann Berstorff Maschinenbau GmbH, Hannover, Fed. Rep. of Germany

[21] Appl. No.: 806,358

[22] Filed: Dec. 13, 1991

[30] Foreign Application Priority Data
Dec. 14, 1990 [DE] Fed. Rep. of Germany ....... 4039944

[51] Int. Cl.5 .................................. B26D 7/14
[52] U.S. Cl. ........................ 83/175; 83/935; 83/446; 83/468.6; 83/367
[58] Field of Search ............... 83/175, 18, 935, 446, 83/468.6, 467.1, 367; 29/2.19

[56] References Cited

U.S. PATENT DOCUMENTS

| | | | |
|---|---|---|---|
| 3,738,218 | 6/1973 | Fujio | 83/18 |
| 4,248,110 | 2/1981 | Spivy | 83/935 |
| 4,437,371 | 3/1984 | Howerton et al. | 83/935 |
| 4,488,465 | 12/1984 | Brand et al. | 83/935 |
| 4,587,872 | 5/1986 | Müller-Erwig | 83/18 |

Primary Examiner—Frank T. Yost
Assistant Examiner—Allan M. Schrock
Attorney, Agent, or Firm—Walter Ottesen

[57] ABSTRACT

An arrangement for cutting thin-walled reinforced closed bands of rubber into rectangular belts having the same width is suggested wherein the closed band is tensioned between two rollers. By deflecting one of the two rollers, the closed band experiences a force component parallel to the roller fixed in position which drives the closed band against a stop. With this arrangement of the stop on the end facing toward the cutting device even thin-walled closed bands can be cut into rectangular belts with a uniformity in width not attained previously.

6 Claims, 4 Drawing Sheets

ARRANGEMENT FOR CUTTING THIN-WALLED BELTS FROM A CLOSED BAND OF RUBBER

BACKGROUND OF THE INVENTION

From German Patent 31 28 111, it is known that a fiber reinforced sleeve-shaped band of rubber can be pushed on rollers which can be separated from each other and which are rotatably journalled about their longitudinal axes, in order to thereafter cut individual V-belts with one or more knives. With such a cutting machine, thin-walled V-belts having the same dimensions can be cut from each closed band; however, it is disadvantageous that the manufacturing sequence for producing such belts can be automated only to a very limited extent. Finally, the V-belts must be released of tension on the rollers after cutting the closed band of rubber into a plurality of individual V-belts and, after one of the roller stands is pivoted away, the V-shaped belts must be removed from the rollers. Only thereafter is the apparatus again ready to be supplied with a closed band and the belts are available for further processing in the form of a heap of 20 to 100 pieces as a rule.

Thin-walled belts having a rectangular cross section cannot be produced on this apparatus since deformations result secondary to a clamping device pressing the closed band against a holding shoe. These deformations do not permit precise belt dimensions at a right angle cross section (column 4, starting at line 66).

Furthermore, a V-belt cutting machine having cantilevered drive and tension rollers is known from U.S. Pat. No. 4,586,410 incorporated herein by reference. Here, the closed band is pushed over both rollers and tensioned. The closed band experiences a component of movement by means of a pivoting movement of the tension roller about a pivot axis lying perpendicular to the roller axis. The component of movement drives the closed band during its rotation about the two rollers against a roller stop provided with a force sensor. A control arrangement connected to the sensor compares the striking force of the closed band to a desired force set previously. If this desired force is reached by means of the further pivoting of the tension roller, then a knife cuts a belt having a predetermined width from the closed band. The cut off belt is taken up by a collecting device and removed to other processing stations. The closed band is brought into position for cutting the next belt by a change of the pivot angle of the tension roller and by a forward displacement of the stop equipped with the sensor.

The periodic removal and transporting away of the belt just cut constitutes a great advantage in that the belt production process can be partially automated. However, in contrast to this advantage, there is the disadvantage that with such an assembly only comparatively thick closed bands of rubber can be cut into belts having the same dimensions. The cause of this is that the stop applies a small force to the closed band which leads to a local deformation at the point of application of the stop at the rearward end face of the closed band. Furthermore, this stop force effects a compressive deformation of the overall closed band which becomes that much greater the thinner the closed band of rubber is.

Since the closed band of rubber tensioned between the rollers exhibits a spring-like behavior when a force is applied to its end faces, the compressive deformation along the closed band becomes ever more noticeable at the opposite end the narrower the remainder of the closed band is which remains because of the continuous cutting off of belts.

This has the consequence that thin belts can be cut only with a pregiven width tolerance which, as a rule, is not acceptable for rectangular belts. In contrast, belts which are cut from a relatively thick closed band and which are therefore less sensitive against the stop deformation can be produced with great use on this equipment. For the production of raw-edged V-belts too, the disadvantages of the equipment described are not significantly noticeable since only the waste piece cut by the knives has various sizes.

SUMMARY OF THE INVENTION

Accordingly, it is an object of the invention to further develop an arrangement for producing belts disclosed in U.S. Pat. No. 4,586,410 in such a manner that also thin closed bands of rubber can be cut into rectangular belts. With the arrangement according to the invention, only one knife, without producing waste, cuts belts with high precision having like dimensions from a closed band and the cut belts are, after their separation, easily removable from the rollers for the purpose of further processing.

BRIEF DESCRIPTION OF THE DRAWINGS

The invention will now be described with reference to the drawings, wherein.

DESCRIPTION OF THE PREFERRED EMBODIMENTS OF THE INVENTION

Figure 1:
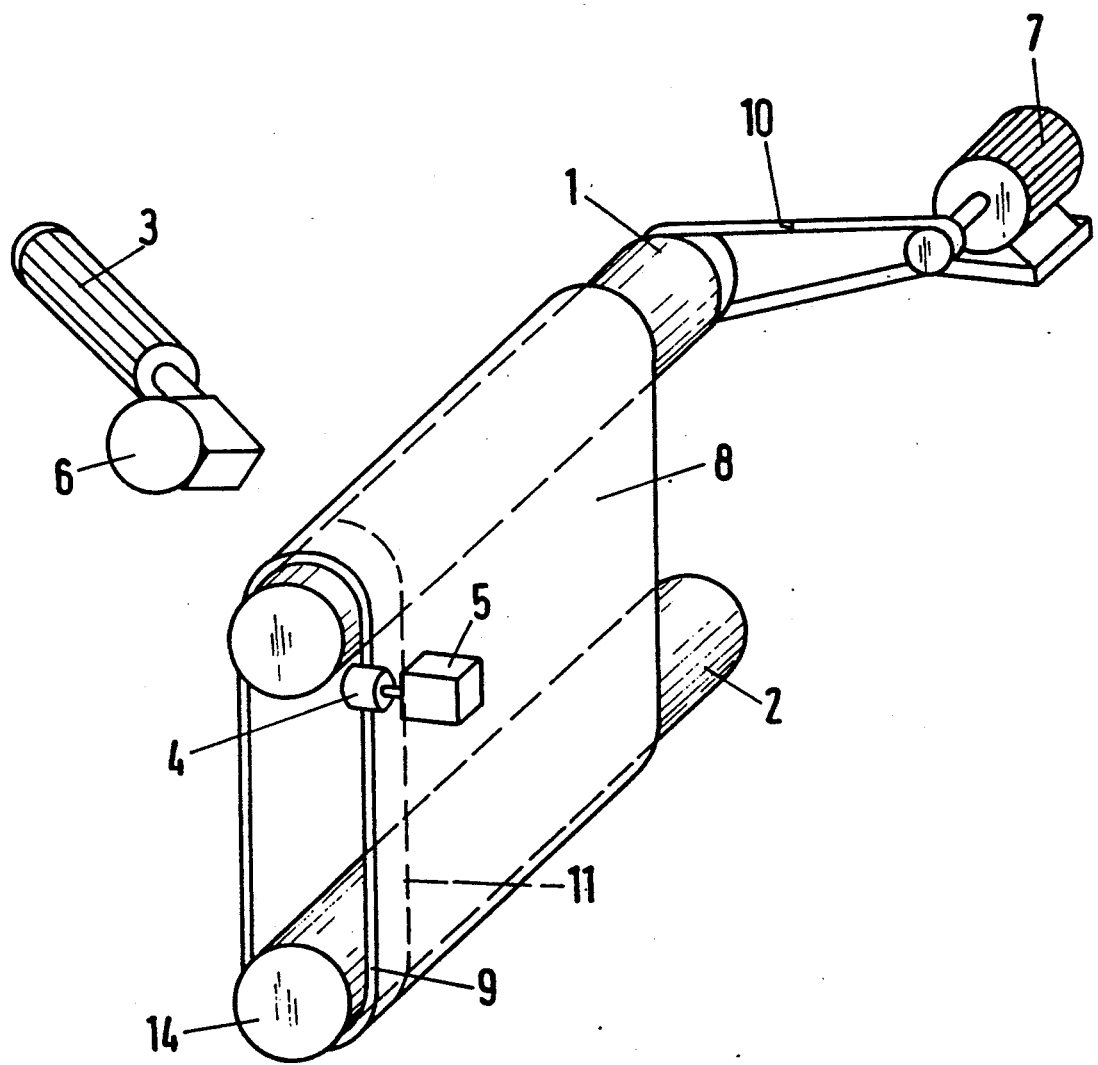
FIG. 1 is a simplified schematic of an embodiment of an arrangement according to the invention for cutting a closed band of rubber.

In the cutting arrangement shown in FIG. 1 for a closed band of rubber, the closed band 8 is tensioned in a known manner between a drive roller 1 and a tensioning roller 2. The drive roller 1 is driven via a drive belt 10 by a motor 7 while the roller 2 serves to tension the closed band 8. A cutting knife 6 is driven by a motor 3 and is mounted at the end region of the closed band 8 facing away from the roller drive. Belts of a rectangular cross section can be cut having the same width from the closed band 8 of the rubber with the cutting knife 6 cutting along the cutting line 11.

By deflecting the rotational axis 14 of the tensioning roller 2 about the axis perpendicular to this rotational axis, the closed band receives a movement component during its movement about the rollers 1, 2 which is in a direction away from the roller drive end. In this way, it is possible to move the closed band 8 forward under the knife 6 after a belt is cut away in order to cut off the next belt.

A roller-shaped stop 4 is mounted in the region of the end faces of the rollers 1, 2 at the cutting end thereof. The stop 4 is connected to a force sensor 5.

Figure 4:
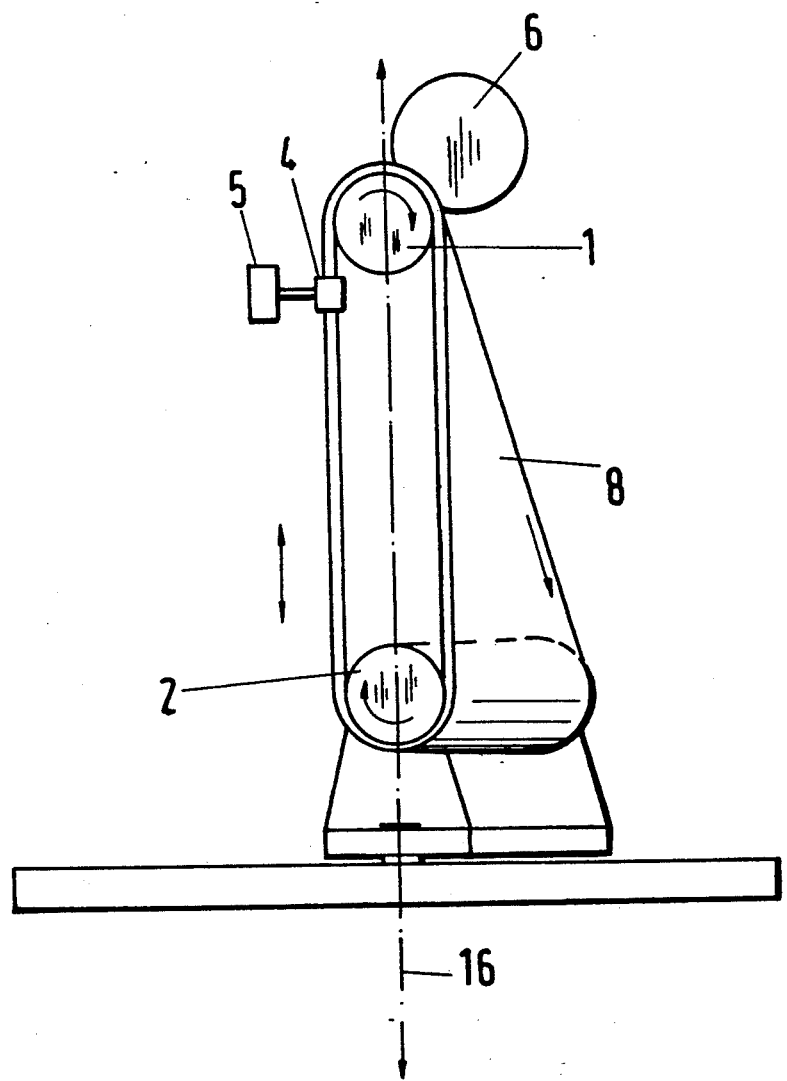
FIG. 4 is a schematic end elevation view of the arrangement of the invention; and, FIG. 5 is a detailed schematic plan view of the arrangement of the invention shown in FIG. 4.
Figure 5:
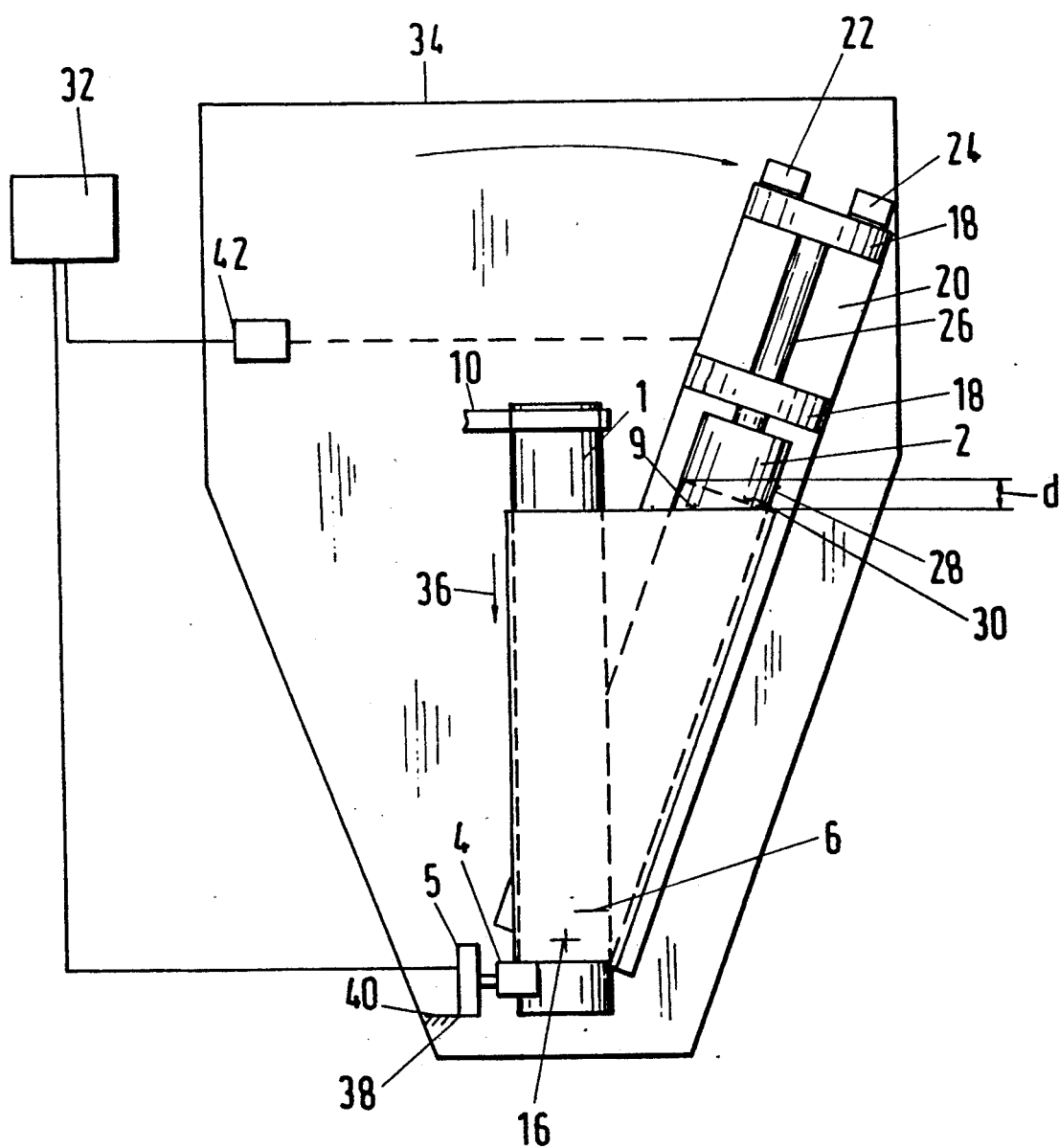

The optimal pivoting of the tension roller 2 can be achieved by the arrangement of the invention shown in greater detail in FIGS. 4 and 5.

The roller 2 is pivotable about a pivot axis 16 perpendicular to the rotational axis 14. This is achieved by mounting the roller 2 in two bearings 18 disposed at one end region of the roller 2 remote from the pivot axis 16. The bearings 18 are mounted on a frame member 20 which is provided with two wheels 22 and 24 which run in a recessed track (not shown). The frame member 20 is pivotally mounted to pivot about a vertical axis 16 thereby also causing the roller 2 to pivot about this axis. The roller is cantilever mounted on the frame 20 by means of the bearings 18 which rotatably journal shaft 26 which extends from the roller 2 as shown.

If the roller 2 is pivoted about the pivot axis 16, the closed band 8 is subjected to increased frictional wear in the edge region 9 thereof. The drive of the roller 2 simultaneously causes the closed band 8 to move along the external surface 28 of the roller 2.

The circular cutter 6, which rotates at high speed, is disposed in the region of the fixed roller 1 and is used to cut a belt from the band 8 as it passes over the roller 1. Whenever a belt is cut from the band 8, it is necessary to ensure that the remainder of the band 8 is moved into the correct position for the next belt to be cut. This is achieved with the aid of the frame 20 and its pivot action about axis 16.

In use, the frame 20 is pivoted through a determined angle. This angle is dependent upon, for example, the thickness and construction of the band 8. The pivotal movement of the frame member 20 determines the tensioning force which is applied to the band 8. The band 8 is also subjected to a definite torsional movement and moves towards the stop in the form of roller 4. Since the band 8 rotates smoothly, the individual belts are separated by means of cutting knife 6.

The band 8 moves along the external surface 28 of the outwardly pivoted roller 2. The roller 2 is pivoted in a plane which is parallel to the axis of the roller 1 about the pivot axis 16.

Because of the above-mentioned rotational movement of the band 8, the band 8 encounters the external surface 28 of the roller 2 when its direction of travel is reversed through 180° as the band 8 passes around this roller. The band 8 therefore endeavours to travel in the direction of the stop 4 while its direction of travel around the roller 2 is being reversed. This situation is indicated by the dotted line 30 on roller 2 in FIG. 5. When the roller 2 is in its pivoted position as illustrated, the band 8 travels a distance (d) in the direction 36 toward the stop 4.

The sensor 5 is connected to a control unit 32 which is connected to a drive unit 42 for deflecting the tensioning roller 2 and frame 20 about the pivot axis 16 so that the closed band 8 receives such a force component in the direction of arrow 36 toward the stop 4 by means of an optimal pivoting of the tension roller 2 that just a reliable surface contact is ensured during an entire movement of the closed band around the rollers 1, 2. The stop 4 mounted at this position makes possible an improvement of the running smoothness of the closed band by developing only a low stop force (for example 100 Newton).

In addition, although the arrangement of the stop 4 at the forward end of the closed band 8 does not avoid the deformation of the closed band 8 caused by the stop force, the effects of the deformation on the precision of the belt width to be cut is substantially constant during the entire cutting time of the closed band. In this way, also thin closed bands can be cut into belts of equal width with a precision which is dependent only upon the measurement tolerance of the force sensor 5 on the stop 4.

The ratio of the width of the closed band to belt width can take on a value from 20:1 up to 100:1. Because of this, the precision with which belts of the same width are to be cut is improved approximately by this ratio compared to the equipment which can be automated known up to now where the stop is mounted on the drive end of the roller.

In order that the cut off belt can be taken from the cutting device and automatically transported away to further processing equipment, the stop 4 is so configured that it can be pivoted about hinge 38 against abutment 40 and away from the end face 9 of the closed band 8.

Figure 2:
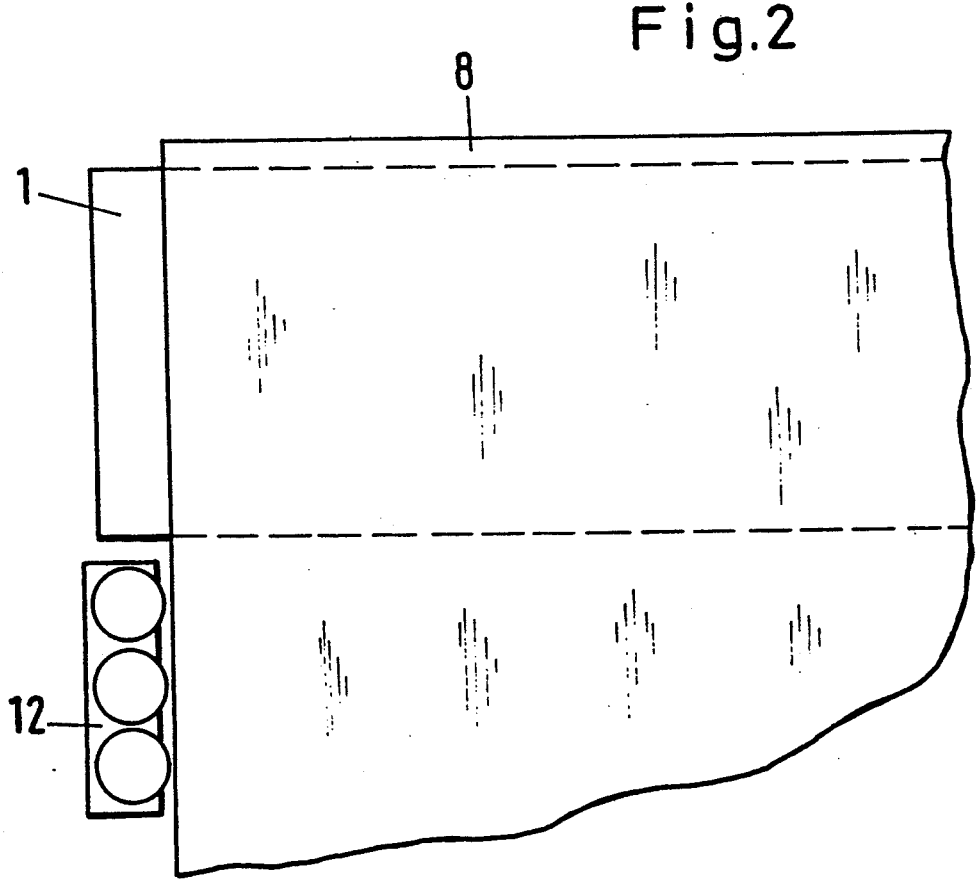
FIG. 2 is a partial view of the arrangement of FIG. 1 equipped with a multiple roller stop.
Figure 3:
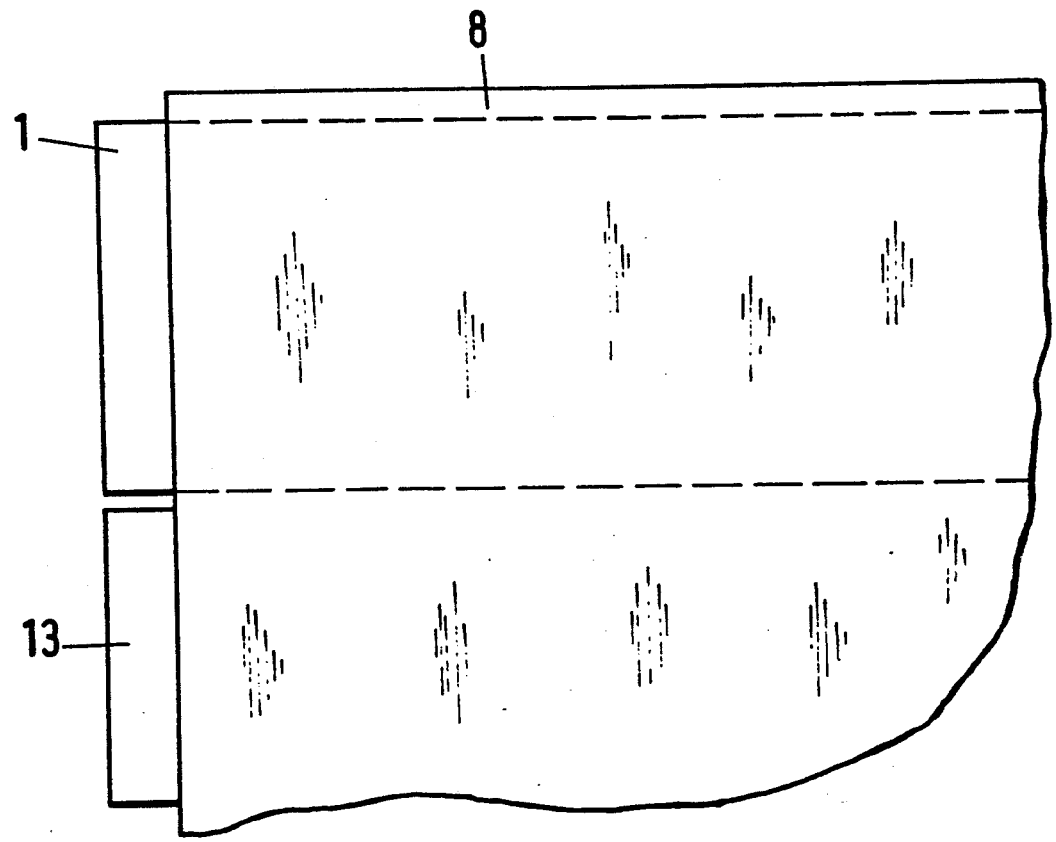
FIG. 3 is a view as in FIG. 2 however with the arrangement equipped with a slide shoe stop.

A further improvement of the tolerance of the belt width can be obtained in that the stop 4 is configured as a multiple roller stop according to FIG. 2 or as a slide shoe according to FIG. 3. With this constructive measure, an increase of the application surface on the end face of the closed band which is to be held back is obtained which leads to a reduction of the deformation of the end face of the closed band.

It is understood that the foregoing description is that of the preferred embodiments of the invention and that various changes and modifications may be made thereto without departing from the spirit and scope of the invention as defined in the appended claims.

What is claimed is:

1. An arrangement for cutting thin-walled belts of rectangular cross section from a closed band of rubber, the arrangement comprising:

a first roller defining a first longitudinal axis;

roller drive means for driving said first roller about said first longitudinal axis;

a second roller rotatably journalled so as to be rotatable about a second longitudinal axis;

said first and second rollers being positioned with respect to each other to permit the closed band of rubber to be pushed over said rollers and be rotated in a continuous movement over said rollers when said first roller is driven by said roller drive means;

said first and second rollers having respective longitudinal forward ends and longitudinal rearward ends;

cutting means mounted adjacent said rollers near said forward ends for cutting said belts from the closed band;

pivot means for pivoting one of said rollers about a pivot axis disposed near the forward end thereof thereby imparting a movement to said closed band toward said forward ends of said rollers corresponding to an incremental displacement of the closed band equal to the width of the belt to be cut from said closed band thereby placing said band into position for cutting the next belt therefrom;

the closed band having a lateral edge facing toward said forward ends of said rollers when the closed band is mounted on said rollers;

stop means for contact engaging said band at said lateral edge to prevent said movement of said closed band from exceeding said incremental displacement;

said stop means being mounted at a fixed position near said forward ends of said rollers;

force sensor means connected to said stop means for sensing the force applied by said closed band to said stop means;

drive means for driving said pivot means to pivot said one roller about said pivot axis; and, a control unit connected between said drive means and said sensor means for forming a drive signal to enable said drive means to cause said pivot means to deflect said one roller through an angle about said pivot axis to ensure a reliable surface contact of said lateral edge against said stop means thereby providing a smooth running of the closed band over said rollers as a belt is cut therefrom while at the same time imparting a deformation to said closed band which is substantially constant during the entire time the belt is cut from the closed band.

2. The arrangement of claim 1, further comprising hinge means for rotating said stop away from said lateral edge of the closed band to facilitate the removal of a cut belt from said rollers.

3. The arrangement of claim 1, said stop means being a roller stop.

4. The arrangement of claim 1, said stop means being a multiple roller stop.

5. The arrangement of claim 1, said stop means being a slide shoe stop.

6. The arrangement of claim 1, said cutting means including a cutting knife and a drive motor for driving said cutting knife.

* * * * *